March 10, 1953  G. O. GRIDLEY  2,630,723

DRILL HEAD

Filed Aug. 30, 1947

INVENTOR.
GEORGE O. GRIDLEY

BY  *Mitchell Berhert*

ATTORNEYS.

Patented Mar. 10, 1953

2,630,723

UNITED STATES PATENT OFFICE 2,630,723

DRILL HEAD

George O. Gridley, Berlin, Conn., assignor to The New Britain Machine Company, New Britain, Conn., a corporation of Connecticut Application August 30, 1947, Serial No. 771,549

4 Claims. (Cl. 77—5)

My invention relates to rotating machines and in particular to an improved tool head for such a machine.

In rotating machines such as drilling machines, it frequently occurs that for a particular feed and cutting speed excessively long chips are produced. These chips may not only interfere with parts of the machine but may also endanger the safety of an operator.

It is, accordingly, an object of my invention to provide an improved tool head having features which will inherently not permit the production of chips of dangerous size.

It is a further object to provide an improved tool head which will periodically break up chips produced by the tool which it carries.

It is also an object to provide an intermittent feed for a tool of the character indicated.

It is a specific object to provide an improved drill head incorporating in itself a mechanism which will superpose an inherently intermittent action on what ever feed is imparted to it.

Figure 1:
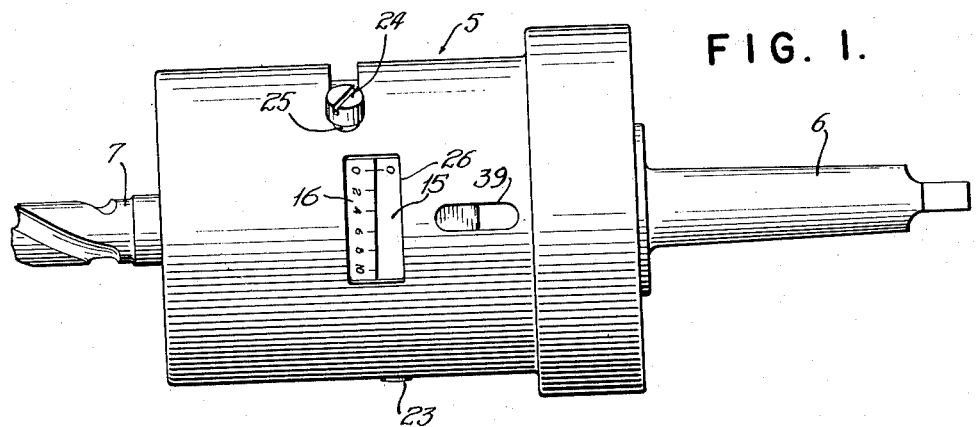
Figure 2:
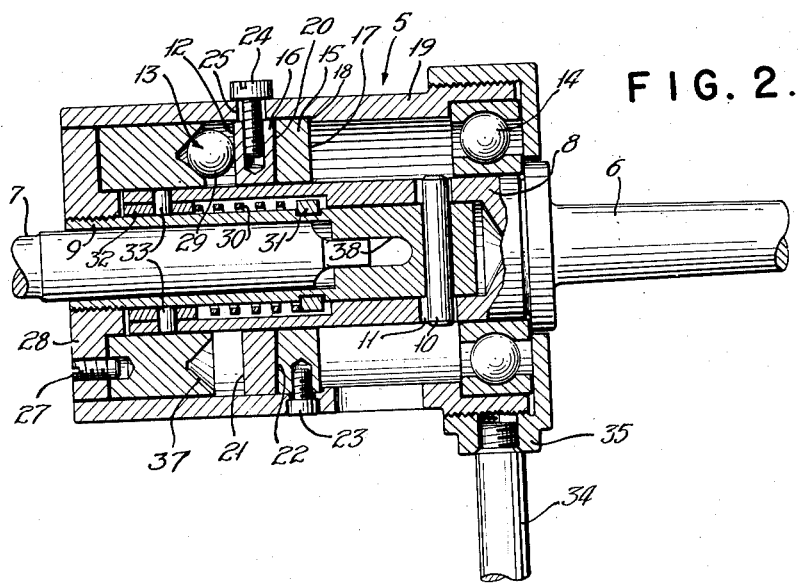

Other objects and various further features of the invention will be pointed out or will occur to those skilled in the art from a reading of the following specification in conjunction with the accompanying drawings. In said drawings:

Fig. 1 is a side view of an assembled drill head incorporating features of the invention; and Fig. 2 is a sectional view taken on the axis of the drill head of Fig. 1.

Briefly stated, my invention contemplates the production of intermittent axial thrust in a drill head or the like, whereby when said drill head is fed for a working cut the intermittent axial thrust is superposed on the feed. The resulting intermittent feed may serve to produce relatively small chips over a wide range of cutting feeds and speeds. In the specific form to be described, the intermittent axial thrust is derived from an annular cam having an axial throw, and a cam follower may translate this throw to the drill or other tool. Means are described for selectably adjusting the amplitude of the axial throw.

Referring to the drawings, my invention is shown in application to a drill-head 5 having at one end a conventional drill shank 6 to engage a drill socket (not shown), and at the other end a drill socket to receive the shank 7 of a drill or other tool. The shank portion 6 is shown formed as a part of what may be termed a first rotatable member 8, and the drill socket forms a part of what may be termed a second rotatable member 9. Key or other means between the driving member 8 and the driven member 9 may assure a positive drive connection, and in the form shown these members are connected by a transverse pin 10. The connection between the members 8—9 is preferably such as to permit axial lost motion therebetween, and in the form shown slots 11 on member 8 permit such axial freedom.

In accordance with the invention, cam means 12 having an axial throw is axially fixed to one of the members 8—9, and cam-follower means 13 to receive this throw is axially fixed to the other of the members 8—9. In the form shown, the cam means 12 is rotatably supported with respect to members 8—9 and axially located with respect to member 8 by means of thrust-receiving bearing means 14, and the cam-follower means 13 is axially carried by the driven member 9.

In accordance with a feature of the invention, cam means 12 is provided with an adjustable mechanism whereby the extent of axial throw may be selected. In the form shown, the cam means 12 comprises two annular plates 15—16 having plane sides slightly inclined with respect to each other. In other words, and for the form shown, the plate 15 has a first plane side 17 seated against a shoulder 18 of an outer housing member 19. This first side or surface 17 may be normal to the axis of the drill head 5. The other side 20 of plate 15 is formed slightly inclined with respect to the side 17; in the form shown, the side 20 will, therefore, be correspondingly slightly inclined to a normal plane. In a similar manner, the cam plate 16 is formed with a first side 21 and with a second side 22 slightly inclined with respect to each other. It will be appreciated that upon a relative angular adjustment of plates 15—16 with respect to each other, the axis of plate 16 will, as a natural consequence, become angularly cocked or tilted relatively to the drill-head axis; the inclined surfaces 20—22 may thus be said, as a natural consequence, to cooperate to produce a tilting surface 21, for a correspondingly adjusted effective axial throw in the contour of the surface 21 of plate 16; it will be understood that to produce the desired adjustable slight tilting of surface 21, only relatively slight inclination of plate 16 is needed, but that enough radial clearance is provided for plate 16 (with respect to other radially adjacent parts) to permit the intended tilting action.

Since each of the plates 15—16 is defined by inclined plane sides, each of plates 15—16 may be said to have an axially thick portion diametrically opposite from an axial thin portion. If the plates 15—16 are relatively rotated into the position in which the axially thick portions of both plates are aligned, then the surface 21 of plate 16 will define a maximum axial throw at the location of such thick portions, and a minimum axial throw at the location of the thin portions. Thus, during operation of the drill, once the plates 15—16 have been secured in the stated relative angular position, the drill bit 7 will be caused to undulate axially upon rotation of the drive member 6.

For other relative angular adjustments of the plates 15—16, the maximum thickness portions of the plates will not be aligned, and therefore the maximum overall thickness of both plates 15—16 together will be something less than the case first stated. In like manner, the thinnest portions of the cam plates 15—16 will not be in alignment, so that the minimum overall thickness, in the case of the second assumed adjustment, will not be so small as the minimum thickness when the thin portions of both plates are in alignment. Therefore, in the second assumed adjusted relationship of plates 15—16, the total throw of the adjustable cam will be less than in the first stated case.

The plate 15 may be secured in its seated position against shoulder 18 by means of a screw 23, and the plate 16 may likewise be secured by a screw or bolt 24 which may be angularly positioned within a slot 25 in the housing member 19. If desired, a further opening 26 may be formed in the housing member 19 so as to reveal adjacent parts of the coacting cam plates 15—16. By graduating one of the plates 15—16 against a fixed mark on the other of plates 15—16, it will be clear that the magnitude of axial throw may be directly read and selected from outside the assembled drill-head unit.

As indicated generally above, cam-follower means 13 may constantly ride against the cam surface 21. This cam-follower means 13 may be carried by the driven rotatable member 9. In the form shown, the cam-follower means 13 comprises a ball raceway 37 generally opposite the cam surface 21, and the raceway 37 is formed in an annular ring secured as by screws 27 to an outer flange 28 formed on the driven rotatable member 9. An antifriction element such as a ball 29 completes the cam-follower 13 and rides between the cam surface 21 and the raceway 37.

In order to assure proper unit-handling relation and to reduce the probabilty of peening the ball 29 or one of the surfaces on which it rides, I prefer resiliently to urge the raceway and the cam into constant engagement with the ball 29. In the form shown, a compression spring 30 performs this function by engaging a snap ring 31 on member 9 and an abutment sleeve 32 carried as by pins 33 by the driving rotatable member 8.

To assist in the removal of the tool 7 from a seated position in the socket of drill head 5, the rotatable members 8—9 may be provided with aligned transversely extending openings 38. These openings may be caused to align with a further opening 39 in member 19, so that a wedging tool may be inserted behind the tip of shank 7 to drive the tool out of the socket, as will be clear.

In operation, a given axial throw is first selected by proper angular placement and tightening of the adjustment screw or bolt 24, the extent of throw being directly read on the scale seen through the opening 26. The drill-head shank 6 may then be inserted in a suitable drill socket and a desired tool or drill 7 inserted in the socket in the driven member 9. The machine may be started after provision is made for relative rotation between the cam means 12 and the drill 7. This relative rotation may be accomplished by merely holding this housing member 19 against rotation, as by means of a piloting finger or arm 34 projecting radially to be held by hand or by resting against a longitudinal guide (not shown). In the form shown, the guide or pilot arm 34 is carried by a cup or ring 35 which serves to secure the thrust bearing 14 in place.

It will be appreciated that with the described relative rotation of members 8—9 with respect to member 19, the antifriction element or ball 29 will walk around the axis of the drill head 5, as guided by the raceway 37. The actual rotational speed of ball 29 will be something like one half the drill speed, and for each revolution of the ball 29 it (the ball 29) will complete a rise-and-fall cycle under the cam surface 21. The rising and falling under cam surface 21 will axially urge member 9 by a corresponding amount, toward and away from the work. The net feed imparted to the drill will then be the small in-and-out throw imparted by cam-follower means 13, superimposed upon the steady drill feed applied by or through the machine itself (not shown). Cutting action will thus be intermittent, so that only small chips may be produced.

It will be appreciated that I have described a novel means for superposing an intermittent feed motion on the feed of a drill or other tool. The intermittent feed may prove particularly useful in the production of small chips, with a resulting improvement at least in safety to the operator of the machine. In certain cases, it will be found that the intermittent feed provided by my invention may also be useful in producing a faster drill or other cut than may otherwise be possible or desirable. The described form of the invention will be appreciated as being particularly applicable to any type of existing machine; in fact, it may be just as applicable as a drill bit to a drilling machine.

While I have described my invention in detail for the preferred form shown, it will be understood that modifications may be made within the scope of the invention as defined in the appended claims.

I claim:

1. Drill-operating mechanism, comprising a drill head, a drill socket for receiving a drill and rotatably mounted in said drill head, mounting means for said drill socket including a lost-motion connection for providing a limited axial movement of said drill socket, and means for imparting such limited axial movement to said drill socket as it rotates; said last-mentioned means including a first member and a second member rotatable relatively to each other on a common axis, one of said members including a plane surface inclined to a normal to said axis, a further member having plane opposed surfaces making a relatively small angle with respect to each other, means adjustably angularly securing said last-defined member with one of its surfaces against said first-mentioned inclined surface, the other of said first two members including cam-follower means riding the exposed plane surface of said adjustable member eccentrically of said axis, whereby upon relative rotation of said first and second members, said drill socket may undulate axially to an extent determined by the relative angular adjustment of said one member and of said further member.

2. Drill-operating mechanism, comprising a drill head, drill-holding means for receiving a drill and rotatably mounted in said drill head, mounting means for said drill-holding means including a lost-motion connection for providing a limited axial movement of said drill-holding means, and means for imparting such limited axial movement to said drill-holding means as it rotates; said last-mentioned means comprising a first member and a second member rotatable relatively to each other on the rotary axis of said drill-holding means, one of said members including annular cam means coaxial with said axis, said annular cam means including a generally annular plane surface inclined to said axis at an angle other than a right angle, an angularly adjustable element adjustably carried with said one member and including two opposed generally annular plane surfaces at a relatively small angle to each other with one of said opposed surfaces against the inclined surface of said one member and with the other of said opposed surfaces exposed, thrust-receiving anti-friction bearing means between the other of said members and said exposed surface, said anti-friction bearing means including an element eccentrically guided with respect to said axis, whereby said drill-holding means may be axially undulated to an extent determined by the angular adjustment of said angularly adjustable element.

3. Drill-operating mechanism, comprising a drill head including two relatively rotatable parts, one of said parts including drill-holding means for holding a drill, mounting means for said drill-holding means and including a lost-motion connection for providing a limited axial movement of said drill-holding means, and means for imparting such limited axial movement to said drill-holding means upon relative rotation of said parts; said last-mentioned means including opposed thrust-receiving races on said relatively rotatable parts, an anti-friction element between said races, one of said races accommodating said element for orbital rotation eccentrically of and in a plane substantially normal to the axis of relative rotation, and the other of said races accommodating said element for orbital rotation in a single plane inclined to the plane of the other of said races, whereby a simple-harmonic feed movement may be generated upon such relative rotation, one of said races comprising cam means including a pair of relatively rotatable circular plates, each of which is defined by plane sides inclined relatively to each other, whereby upon an angular adjustment of said plates relatively to each other the effective throw of said cam means, and, therefore, of said drill-holding means, may be adjusted.

4. Drill-operating mechanism, comprising a drill head including a body with means for holding the same against rotation, drill-socket means for receiving a drill at one end of said body and rotatably mounted in said body, central head-drive means including a shank projecting beyond the other end of said body for engagement with driving means, thrust-bearing means supporting said head-drive means for rotation in said body on the axis of said drill socket, lost-motion key means connecting said head-drive means and said socket means for rotation together and for providing a limited axial movement of said drill-socket means, spring means urging said drill-socket means toward said head-drive means, annular-cam means carried by said body and having a cam face undulating axially as a function of angle about the axis of said drive means, said cam means comprising two relatively rotatable annular members each of which is defined by opposed plane sides inclined relatively to each other, means securing one of said annular members to said body with the plane side thereof which is adjacent said other annular member inclined from a normal plane about said axis, means for adjustably angularly securing the other of said members to said body and circumferentially continuously adjacent the inclined face of said one annular member, whereby the exposed face of said other annular member may constitute the cam face of said cam means, and cam-follower means carried eccentrically by said drill-socket means and riding said cam face under the urging of said spring means.

GEORGE O. GRIDLEY.

REFERENCES CITED

The following references are of record in the file of this patent:

UNITED STATES PATENTS

| Number | Name | Date |
| --- | --- | --- |
| 779,511 | Weathers | Jan. 10, 1905 |
| 1,523,629 | Bullock | Jan. 20, 1925 |
| 2,328,542 | Bates | Sept. 7, 1943 |
| 2,412,211 | Eichelman | Dec. 10, 1946 |
| 2,430,019 | Jenkins | Nov. 4, 1947 |

FOREIGN PATENTS

| Number | Country | Date |
| --- | --- | --- |
| 623,715 | France | Mar. 22, 1927 |